United States Patent
Raybuck, III et al.

(10) Patent No.: US 10,339,813 B2
(45) Date of Patent: Jul. 2, 2019

(54) DISPLAY CONTROL SYSTEMS AND METHODS FOR A VEHICLE

(71) Applicant: GM Global Technology Operations LLC, Detroit, MI (US)

(72) Inventors: Richard Raybuck, III, Grand Blanc, MI (US); Johannes Huth, Trebur (DE); Mohannad Murad, Troy, MI (US); Justin K. Francisco, White Lake, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 72 days.

(21) Appl. No.: 15/488,955

(22) Filed: Apr. 17, 2017

(65) Prior Publication Data
US 2018/0297525 A1    Oct. 18, 2018

(51) Int. Cl.
| | |
|---|---|
| *G08G 1/16* | (2006.01) |
| *G06F 3/14* | (2006.01) |
| *G06K 9/00* | (2006.01) |
| *H04N 5/232* | (2006.01) |
| *G06K 9/62* | (2006.01) |
| *B60R 1/00* | (2006.01) |
| *G01S 19/13* | (2010.01) |

(52) U.S. Cl.
CPC .............. *G08G 1/168* (2013.01); *B60R 1/00* (2013.01); *G06F 3/14* (2013.01); *G06K 9/00805* (2013.01); *G06K 9/627* (2013.01); *H04N 5/23293* (2013.01); *B60R 2300/607* (2013.01); *B60R 2300/70* (2013.01); *B60R 2300/806* (2013.01); *G01S 19/13* (2013.01)

(58) Field of Classification Search
CPC ...... G08G 1/168; B60R 1/00; B60R 2300/70; B60R 2300/806; B60R 2300/607; G06K 9/627; G06K 9/00805; H04N 5/23293; G01S 19/13; G06F 3/14
See application file for complete search history.

(56) References Cited

U.S. PATENT DOCUMENTS

| | | | |
|---|---|---|---|
| 2014/0118549 A1* | 5/2014 | Meldrum | B60R 1/00 348/148 |
| 2016/0203377 A1* | 7/2016 | Irie | G08G 1/168 348/118 |
| 2017/0361835 A1* | 12/2017 | Tarte | G08G 1/149 |
| 2018/0186407 A1* | 7/2018 | Kim | G06K 9/00812 |

* cited by examiner

Primary Examiner — Nadeem Odeh
Assistant Examiner — Michael V Kerrigan

(57) ABSTRACT

A display control system of a vehicle includes a surround view module configured to generate a surround view including a predetermined top view image of vehicle and one or more features located within a predetermined area around the vehicle. A parking module is configured to selectively generate a parking signal when, for at least a predetermined period, a vehicle speed is less than a predetermined speed and at least one of: (i) an accelerator pedal position is less than a predetermined position; (ii) a brake pedal position indicates a request for vehicle braking; and (iii) a magnitude of a steering wheel angle is greater than a predetermined steering wheel angle. A display control module is configured to, in response to the generation of the parking signal, display the surround view on a display within the vehicle.

20 Claims, 5 Drawing Sheets

DISPLAY CONTROL SYSTEMS AND METHODS FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle systems and more particularly to systems and methods for controlling a display within a vehicle.

Vehicles include one or more torque producing devices, such as an internal combustion engine and/or an electric motor. A passenger of a vehicle rides within a passenger cabin (or passenger compartment) of the vehicle.

An infotainment system of a vehicle provides various features, such as navigation, mapping, radio, calling, messaging, mobile device connection, and other features. Infotainment systems of vehicles can be referred to as in-vehicle infotainment (IVI) systems and in-vehicle entertainment (IVE) systems. An infotainment system includes a display that displays various infotainment related information. Some infotainment systems include touchscreen displays that also receive user input via user touching.

SUMMARY

In a feature, a display control system of a vehicle includes a surround view module configured to generate a surround view based on: (i) first images of an outward front view of in front of the vehicle captured using a first camera; (ii) second images of an outward right side view to the right of the vehicle captured using a second camera; (iii) third images of an outward left side view to the left of the vehicle captured using a third camera; and (iv) fourth images of an outward rear view of behind the vehicle captured using a fourth camera. The surround view includes a predetermined top view image of vehicle and one or more features located within a predetermined area around the vehicle captured in the first, second, third, and fourth images. A parking module is configured to selectively generate a parking signal when, for at least a predetermined period, a vehicle speed is less than a predetermined speed and at least one of: (i) an accelerator pedal position is less than a predetermined position; (ii) a brake pedal position indicates a request for vehicle braking; and (iii) a magnitude of a steering wheel angle is greater than a predetermined steering wheel angle. A display control module is configured to, in response to the generation of the parking signal, display the surround view on a display within the vehicle.

In further features, an enabling/disabling module is configured to disable the parking module when a global positioning system (GPS) location of the vehicle is at a location where vehicle parking is not available.

In further features, an object identification module is configured to, based on fifth images in front of the vehicle, identify whether one or more traffic signals are located in front of the vehicle. An enabling/disabling module is configured to disable the parking module in response to the object identification module identifying that one or more traffic signals are located in front of the vehicle.

In further features, an object identification module is configured to, based on fifth images in front of the vehicle, identify whether one or more other vehicles are located in front of the vehicle. An enabling/disabling module is configured to disable the parking module in response to the object identification module identifying that one or more other vehicles are located in front of the vehicle.

In further features, an enabling/disabling module is configured to disable the parking module when vehicle to infrastructure (V2I) signals are indicative of the vehicle being at a location where vehicle parking is not available.

In further features, a parking marker module is configured to, based on at least one of the first, second, third, and fourth images, indicate whether one or more parking markers are located within the predetermined area around the vehicle. The parking module is configured to, in response to the parking marker module indicating that one or more parking markers are located within the predetermined area around the vehicle, decrease the predetermined steering wheel angle.

In further features, a parking marker module is configured to, based on at least one of the first, second, third, and fourth images, indicate whether one or more parking markers are located within the predetermined area around the vehicle. The parking module is configured to, in response to the parking marker module indicating that one or more parking markers are located within the predetermined area around the vehicle, increase the predetermined position.

In further features, a parking marker module is configured to, based on at least one of the first, second, third, and fourth images, indicate whether one or more parking markers are located within the predetermined area around the vehicle. The parking module, in response to the parking marker module indicating that one or more parking markers are located within the predetermined area around the vehicle, is configured to increase the predetermined position and decrease the predetermined steering wheel angle.

In further features, a human module is configured to, based on at least one of the first, second, third, and fourth images, indicate whether one or more humans are located within the predetermined area around the vehicle. The display control module is configured to, in response to the human module indicating that a human is located within the predetermined area around the vehicle, display, on the display, both: the surround view on a first portion of the display; and one of the first, second, third, and fourth images including the human on a second portion of the display, the first and second portions of the display being different portions of the display.

In further features, the display control module is configured to, in response to the human module indicating that the human is located less than a predetermined distance from the vehicle, display only one of the first, second, third, and fourth images including the human on the display. The predetermined distance is less than a distance between the vehicle and a boundary of the predetermined area in the direction of the human.

In a feature, a display control method includes generating a surround view based on: (i) first images of an outward front view of in front of the vehicle captured using a first camera; (ii) second images of an outward right side view to the right of the vehicle captured using a second camera; (iii) third images of an outward left side view to the left of the vehicle captured using a third camera; and (iv) fourth images of an outward rear view of behind the vehicle captured using a fourth camera. The surround view includes a predetermined top view image of vehicle and one or more features located within a predetermined area around the vehicle captured in the first, second, third, and fourth images. The display control method further includes: selectively generating a parking signal when, for at least a predetermined period, a vehicle speed is less than a predetermined speed and at least one of: (i) an accelerator pedal position is less than a predetermined position; (ii) a brake pedal position indicates a request for vehicle braking; and (iii) a magnitude of a steering wheel angle is greater than a predetermined steering wheel angle; and in response to the generation of the parking signal, displaying the surround view on a display within the vehicle.

In further features, the display control method further includes preventing generation of the parking signal when a global positioning system (GPS) location of the vehicle is at a location where vehicle parking is not available.

In further features, the display control method further includes: based on fifth images in front of the vehicle, identifying whether one or more traffic signals are located in front of the vehicle; and preventing generation of the parking signal in response to the identification of one or more traffic signals are located in front of the vehicle.

In further features, the display control method further includes: based on fifth images in front of the vehicle, identifying whether one or more other vehicles are located in front of the vehicle; and preventing generation of the parking signal in response to the identification of one or more other vehicles are located in front of the vehicle.

In further features, the display control method further includes preventing generation of the parking signal when vehicle to infrastructure (V2I) signals are indicative of the vehicle being at a location where vehicle parking is not available.

In further features, the display control method further includes: based on at least one of the first, second, third, and fourth images, indicating whether one or more parking markers are located within the predetermined area around the vehicle; and in response to the indication that one or more parking markers are located within the predetermined area around the vehicle, decreasing the predetermined steering wheel angle.

In further features, the display control method further includes: based on at least one of the first, second, third, and fourth images, indicating whether one or more parking markers are located within the predetermined area around the vehicle; and in response to the indication that one or more parking markers are located within the predetermined area around the vehicle, increasing the predetermined position.

In further features, the display control method further includes: based on at least one of the first, second, third, and fourth images, indicating whether one or more parking markers are located within the predetermined area around the vehicle; and in response to the indication that one or more parking markers are located within the predetermined area around the vehicle: increasing the predetermined position; and decreasing the predetermined steering wheel angle.

In further features, the display control method further includes: based on at least one of the first, second, third, and fourth images, indicating whether one or more humans are located within the predetermined area around the vehicle; in response to the indication that a human is located within the predetermined area around the vehicle, displaying, on the display, both: the surround view on a first portion of the display; and one of the first, second, third, and fourth images including the human on a second portion of the display. The first and second portions of the display are different portions of the display.

In further features, the display control method further includes, in response to the indication that the human is located less than a predetermined distance from the vehicle, displaying only one of the first, second, third, and fourth images including the human on the display. The predetermined distance is less than a distance between the vehicle and a boundary of the predetermined area in the direction of the human.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
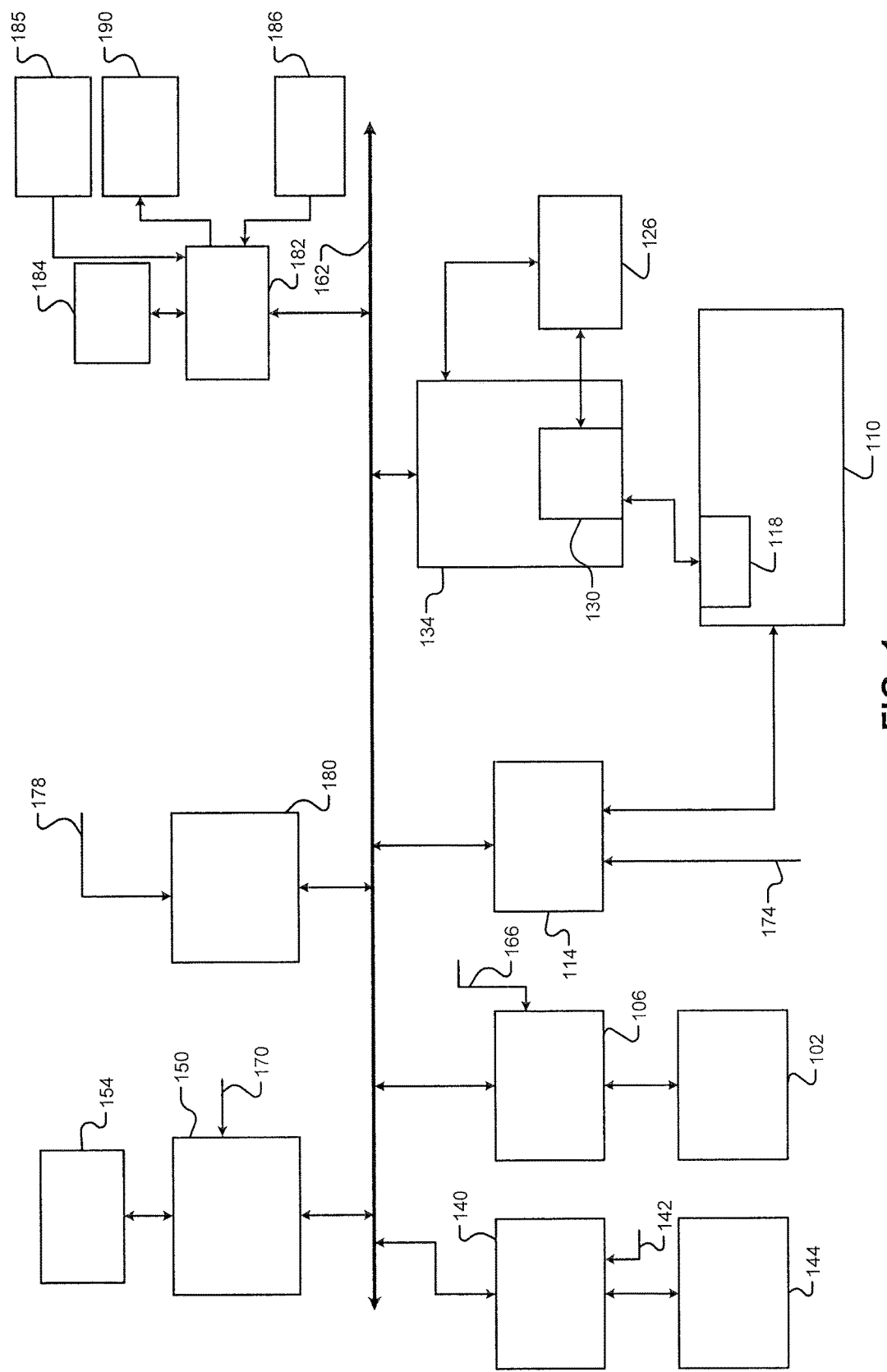
FIG. 1 is a functional block diagram of an example vehicle system.

An infotainment system of a vehicle controls various aspects of in-vehicle entertainment and communication. For example, an infotainment module of a vehicle may control volume of sound output via speakers within the vehicle, selection of a source of sound output via the speakers, what is displayed on a display within the vehicle, climate control settings of the vehicle, etc.

Under some circumstances, the infotainment module may display video from one or more cameras capturing images around the vehicle. For example, when a vehicle speed is less than a first predetermined speed (e.g., 5 miles per hour) and an object is detected within a predetermined distance from the vehicle (e.g., 0.3 meters), the infotainment module may display a surround view video on the display.

The surround view may include a top view of the vehicle and features (objects, road markings, etc.) that are located within the predetermined area centered at a center of the vehicle. The infotainment module generates the surround view video by stitching together video or images from front, rear, right side, and left side cameras of the vehicle. Some vehicle users, however, may wish to have the surround view video displayed when the vehicle speed is greater than the first predetermined speed and/or before an object is within the predetermined distance of the vehicle.

According to the present application, the infotainment module displays the surround view video when the vehicle speed is less than a second predetermined speed (greater than the first predetermined speed) and one or more driver inputs are indicative of vehicle parking. For example, the infotainment module displays the surround view video when the vehicle speed is less than the second predetermined speed and at least one of: an accelerator pedal position is less than a predetermined position, a brake pedal position indicates that a brake pedal is being actuated, and a magnitude of a steering wheel angle is greater than a predetermined angle. The surround view may therefore be displayed to vehicle users earlier during parking, thereby increasing user experience.

The infotainment module may also adjust one or more of the predetermined values used to determine whether to display the surround view video based on whether markers indicative of parking (e.g., parking lot markers, wheel bumpers, curbs, etc.) are present around the vehicle. For example, the infotainment module may increase the predetermined position and/or decrease the predetermined angle when markers indicative of parking are present around the vehicle. This may further enhance the user experience.

The infotainment module may display a split screen view under some circumstances. The split screen view includes one type of video on one portion of the display and another type of video on another portion of the display. For example, when parking the vehicle against a curb, the infotainment module may display the surround view video on one portion of the display and video in the direction of the curb on another other portion of the display. As another example, when the infotainment module identifies a human within a first predetermined distance of the vehicle, the infotainment module may display the surround view video on one portion (e.g., half) of the display and video in a direction of the human on another portion (e.g., half) of the display. In addition to providing the surround view video, the split screen view may provide users with visual information regarding the spatial relationship between the vehicle and a human. When a human is within a second predetermined distance (less than the first predetermined distance) of the vehicle, the infotainment module may vary what is displayed to remove the surround view video and display video in the direction of the human on the entire display.

Referring now to FIG. 1, a functional block diagram of an example vehicle system is presented. While a vehicle system for a hybrid vehicle is shown and will be described, the present disclosure is also applicable to non-hybrid vehicles, electric vehicles, fuel cell vehicles, autonomous vehicles, and other types of vehicles. Also, while the example of a vehicle is provided, the present application is also applicable to non-vehicle implementations.

An engine 102 combusts an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130.

When acting as a motor, an electric motor generates torque that may be used, for example, to supplement or replace torque output by the engine 102. While the example of one electric motor is provided, the vehicle may include zero or more than one electric motor.

A power inverter control module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as a power inverter module (PIM) in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system.

An electronic brake control module (EBCM) 150 may selectively control brakes 154 of the vehicle. Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 which may be provided to the ECM 106. A brake pedal position (BPP) 170 may be provided to the EBCM 150. A position 174 of a park, reverse, neutral, drive lever (PRNDL) may be provided to the TCM 114. An ignition state 178 may be provided to a body control module (BCM) 180. For example, the ignition state 178 may be input by a driver via an ignition key, button, or switch. At a given time, the ignition state 178 may be one of off, accessory, run, or crank.

The vehicle system also includes an infotainment module 182. The infotainment module 182 controls what is displayed on a display 184. The display 184 may be a touchscreen display in various implementations and transmit signals indicative of user input to the display 184 to the infotainment module 182. The infotainment module 182 may additionally or alternatively receive signals indicative of user input from one or more other user input devices 185, such as one or more switches, buttons, knobs, etc.

The infotainment module 182 may receive input from a plurality of external sensors and cameras, generally illustrated in FIG. 1 by 186. For example, the infotainment module 182 may display video, various views, and/or alerts on the display 184 via input from the external sensors and cameras 186.

The infotainment module 182 may also generate output via one or more other devices. For example, the infotainment module 182 may output sound via one or more speakers 190 of the vehicle. The vehicle may include one or more additional control modules that are not shown, such as a chassis control module, a battery pack control module, etc. The vehicle may omit one or more of the control modules shown and discussed.

Figure 2:
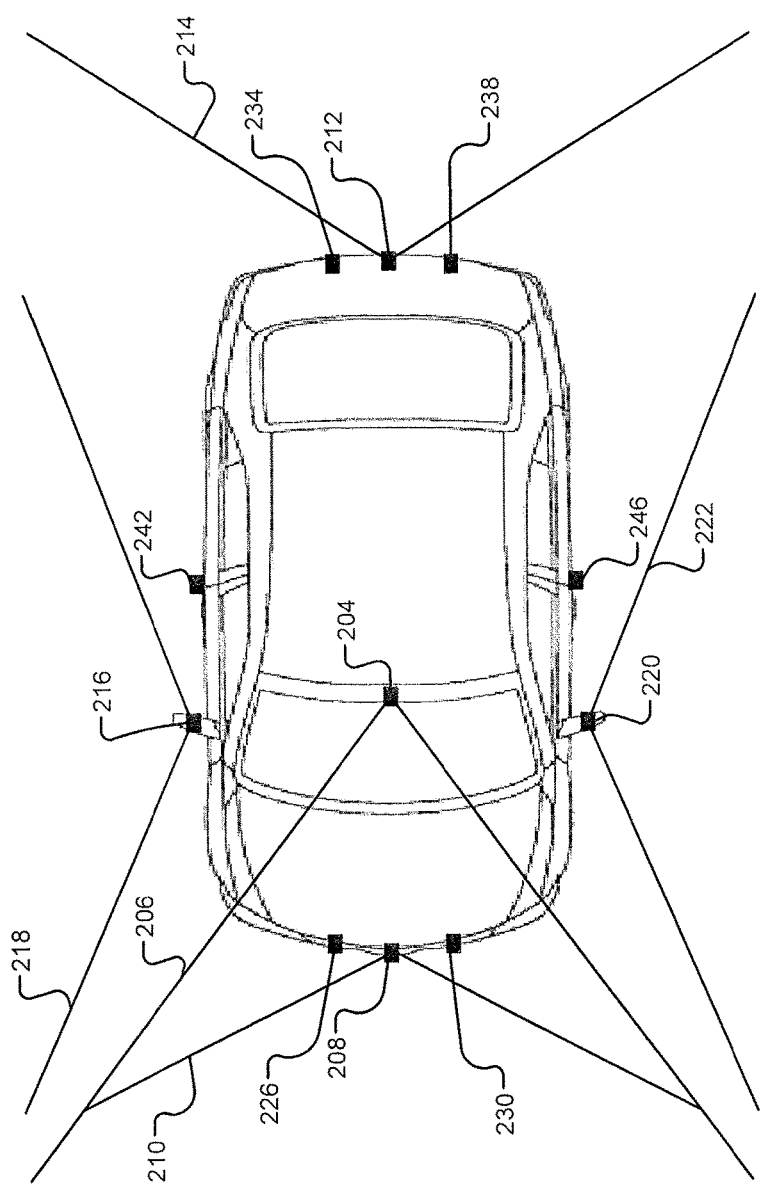
FIG. 2 is a functional block diagram of a vehicle including various cameras.

Referring now to FIG. 2, a functional block diagram of a vehicle including examples of external sensors and cameras is presented. The external sensors and cameras 186 include various cameras positioned to capture images and video outside of (external to) the vehicle and various types of sensors measuring parameters outside of (external to the vehicle). For example, a forward facing camera 204 captures images and video of images within a predetermined field of view (FOV) 206 in front of the vehicle.

A front camera 208 may also capture images and video within a predetermined FOV 210 in front of the vehicle. The front camera 208 may capture images and video within a predetermined distance of the front of the vehicle and may be located at the front of the vehicle (e.g., in a front fascia, grille, or bumper). The forward facing camera 204 may be located more rearward, such as with a rear view mirror within a windshield of the vehicle. The forward facing camera 204 may not be able to capture images and video of items within all of or at least a portion of the predetermined FOV of the front camera 208 and may capture images and video that is greater than the predetermined distance of the front of the vehicle. In various implementations, only one of the forward facing camera 204 and the front camera 208 may be included.

A rear camera 212 captures images and video within a predetermined FOV 214 behind the vehicle. The rear camera 212 may capture images and video within a predetermined distance behind vehicle and may be located at the rear of the vehicle, such as near a rear license plate. A right camera 216 captures images and video within a predetermined FOV 218 to the right of the vehicle. The right camera 216 may capture images and video within a predetermined distance to the right of the vehicle and may be located, for example, under a right side rear view mirror. In various implementations, the right side rear view mirror may be omitted, and the right camera 216 may be located near where the right side rear view mirror would normally be located. A left camera 220 captures images and video within a predetermined FOV 222 to the left of the vehicle. The left camera 220 may capture images and video within a predetermined distance to the left of the vehicle and may be located, for example, under a left side rear view mirror. In various implementations, the left side rear view mirror may be omitted, and the left camera 220 may be located near where the left side rear view mirror would normally be located. While the example FOVs are shown for illustrative purposes, the FOVs may overlap, for example, for more accurate and/or inclusive stitching.

The external sensors and cameras 186 also include various other types of sensors, such as ultrasonic (e.g., radar) sensors. For example, the vehicle may include one or more forward facing ultrasonic sensors, such as forward facing ultrasonic sensors 226 and 230, one or more rearward facing ultrasonic sensors, such as rearward facing ultrasonic sensors 234 and 238. The vehicle may also include one or more right side ultrasonic sensors, such as right side ultrasonic sensor 242, and one or more left side ultrasonic sensors, such as left side ultrasonic sensor 246. The locations of the cameras and ultrasonic sensors are provided as examples only and different locations could be used. Ultrasonic sensors output ultrasonic signals around the vehicle. The infotainment module 182 detects objects around the vehicle based on signals from the ultrasonic sensors generated based on signals reflected back by objects around the vehicle.

Figure 5:
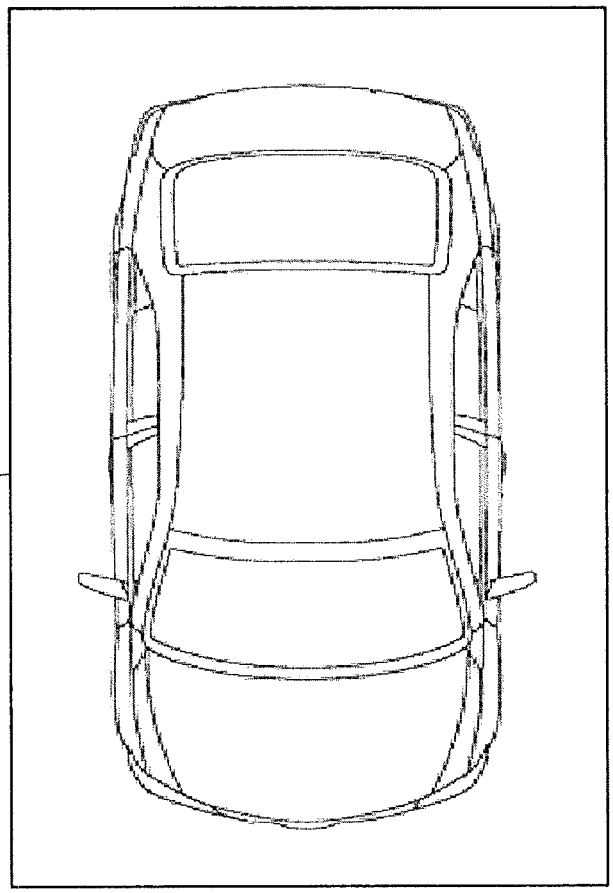
FIG. 5 includes an example surround view including a predetermined top view image of a vehicle and features located within a predetermined area centered at a center of the vehicle.

Under some circumstances, such as discussed further below, the infotainment module 182 may stitch together video from the front camera 208 (and/or the forward facing camera 204), the rear camera 212, the right camera 216, and the left camera 220 to generate surround view video and display the surround view video on the display 184. The surround view video includes video as viewed from above the vehicle (a top view) and includes an image of the vehicle and objects around the vehicle, such as vehicles, markers on the road (e.g., lines, curbs, parking blocks, etc.), humans (e.g., pedestrians, bicyclists, etc.), and other objects near the vehicle. The surround view may also include other information, such as one or more indicators of vehicle trajectory. FIG. 5 includes an example surround view including a predetermined top view image of the vehicle and a predetermined area 504 centered at a center of the vehicle.

Figure 3:
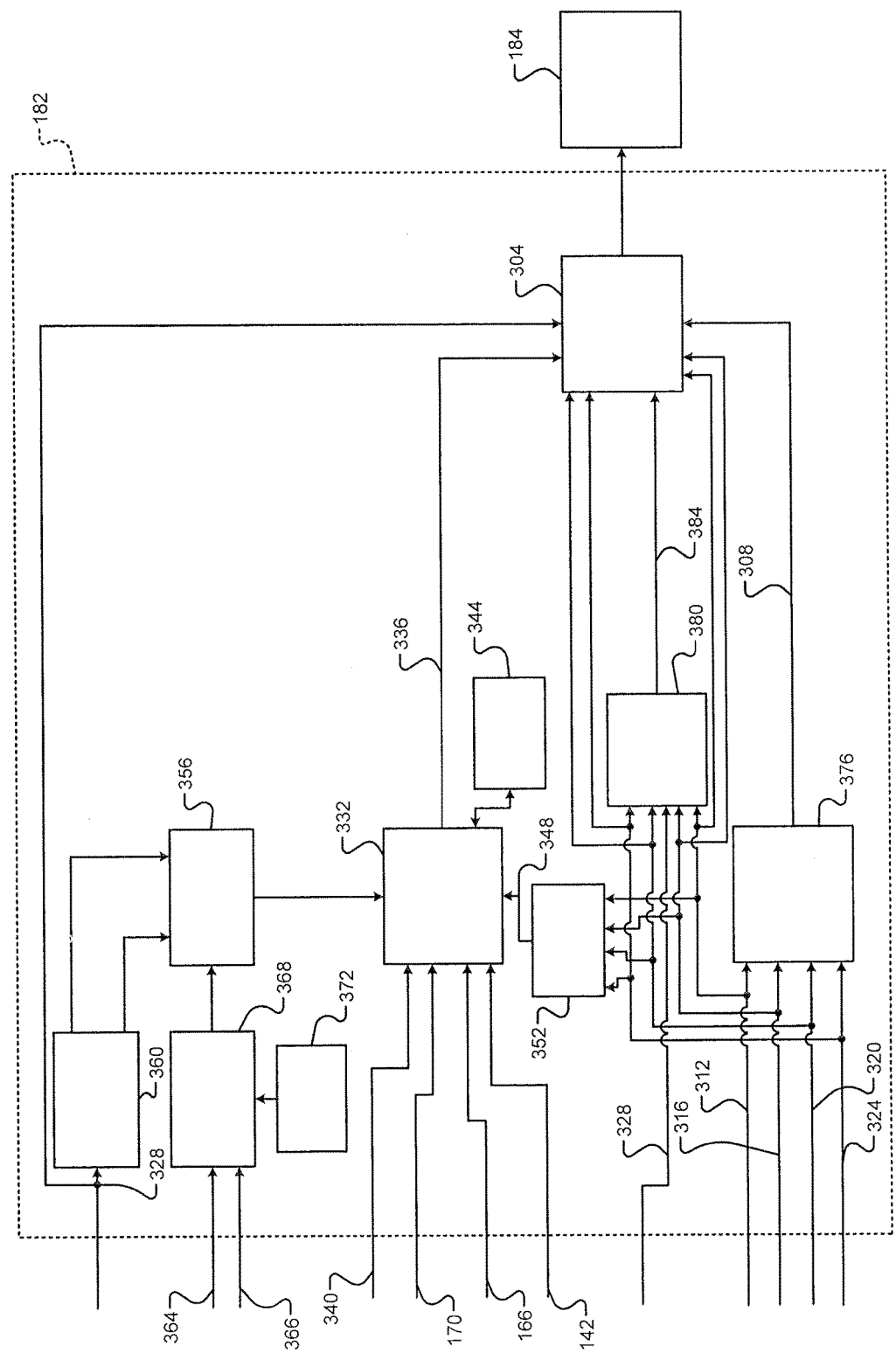
FIG. 3 is a functional block diagram of an infotainment module.

FIG. 3 is a functional block diagram of an example implementation of the infotainment module 182. The infotainment module 182 includes a display control module 304 controls what is displayed on the display 184. For example, the display control module 304, under some circumstances, the display control module 304 may display video of a surround view 308 and/or video from front images 312 captured using the front camera 208, video from right side images 316 captured using the right camera 216, video from left side images 320 captured using the left camera 220, video from rear images 324 captured using the rear camera 212, or video from forward facing images 328 captured using the forward facing camera 204.

Specifically, the display control module 304 displays video of the surround view 308 in response to a parking module 332 indicating that the vehicle is parking. The parking module 332 may indicate that the vehicle is parking by setting a parking signal 336 to a first state. The parking module 332 may indicate that the vehicle is not parking by setting the parking signal 336 to a second state.

When disabled, the parking module 332 sets the parking signal 336 to the second state. When enabled, the parking module 332 determines whether the vehicle is parking (and whether to set the parking signal 336 to the first state) based on the SWA 142, the APP 166, the BPP 170, and a vehicle speed 340. The SWA 142 may be measured by a SWA sensor. The APP 166 may be measured by an APP sensor. The BPP 170 may be measured by a BPP sensor. The vehicle speed 340 may be determined, for example, based on one or more wheel speeds measured using wheel speed sensors. For example, the TCM 114 may determine the vehicle speed 340 based on an average of two or more wheel speeds (e.g., undriven wheel speeds) measured using respective wheel speed sensors. However, the vehicle speed 340 may be obtained in another way.

The APP 166 may have a range between 0 and 100 percent. 0 percent may correspond to a steady-state position where the accelerator pedal rests when the driver is not applying pressure to the accelerator pedal. 100 percent may correspond to a position where the driver has actuated the accelerator pedal to a predetermined maximum extent. The APP 166 may increase toward or to 100 percent when the driver applies pressure to the accelerator pedal, thereby actuating the accelerator pedal away from the steady-state position. The APP 166 may decrease toward or to 0 percent when the driver releases the accelerator pedal to allow the accelerator pedal to return to the steady-state position. While this example range is provided, other ranges or values may be used to express the APP 166.

The BPP 170 may be a first value (e.g., 0) when the brake pedal is in a steady-state position where the brake pedal rests when the driver is not applying pressure to the brake pedal. The BPP 170 may be a second value (e.g., 1) when the driver has actuated the brake pedal away from the steady-state position to request performance of braking. While this example is provided, other values may be used to express the BPP 170. In various implementations, the BPP 170 may be expressed in terms of a range, for example, similar to a range of values used to express the APP 166.

The SWA 142 may have a range between a predetermined negative SWA and a predetermined positive SWA. The predetermined negative SWA may correspond to a position of the steering wheel when the steering wheel has been rotated to a greatest extent counter-clockwise, for example, to turn the vehicle to the left. The predetermined positive SWA may correspond to a position of the steering wheel when the steering wheel has been rotated to a greatest extent clockwise, for example, to turn the vehicle to the right. A 0 SWA may correspond to a position of the steering wheel where the vehicle should travel straight along its longitudinal axis.

Using the examples provided above, the parking module 332 may determine that the vehicle is parking (and set the parking signal 336 to the first state) when, for a predetermined period, the vehicle speed 340 is greater than zero and less than a predetermined speed and at least one of: (i) the APP 166 is greater than zero and less than a predetermined APP, (ii) the BPP 170 is set to the second value, (iii) a magnitude of the SWA 142 is greater than a predetermined SWA, and (iv) a lateral acceleration of the vehicle is less than a predetermined lateral acceleration. The lateral acceleration may be, for example, measured using a lateral acceleration sensor.

When enabled, the parking module 332 may increment a timer value (corresponding to a period) stored by a timer module 344 each control loop when the vehicle speed is less than the predetermined speed and at least one of (i)-(iv) is satisfied. The parking module 332 may reset the timer value via the timer module 344 each control loop when the vehicle speed is greater than the predetermined speed and none of (i)-(iv) is satisfied. The parking module 332 may also reset the timer value when the parking module 332 is disabled and/or when the parking module 332 transitions from disabled to enabled.

The parking module 332 may therefore determine that the vehicle is parking and set the parking signal 336 to the first state when the timer value tracked by the timer module 344 is greater than a predetermined value. The parking module 332 may determine that the vehicle is not parking and set the parking signal 336 to the second state when the timer value is less than the predetermined value.

The parking module 332 sets the predetermined value, the predetermined APP, and the predetermined SWA to respective ones of a first set of predetermined values or to respective ones of a second set of predetermined values based on a parking marker signal 348. For example, when the parking marker signal 348 is in a first state, the parking module 332 sets the predetermined value, the predetermined APP, and the predetermined SWA to a first predetermined value, a first predetermined APP, and a first predetermined SWA of the first set, respectively. When the parking marker signal 348 is in a second state, the parking module 332 sets the predetermined value, the predetermined APP, and the predetermined SWA to a second predetermined value, a second predetermined APP, and a second predetermined SWA of the second set, respectively.

At least one of the first predetermined value, the first predetermined APP, and the first predetermined SWA is greater than the second predetermined value, the second predetermined APP, and the second predetermined SWA, respectively. For example, the predetermined value and the first predetermined SWA may be greater than the second predetermined value and the second predetermined SWA, respectively. The first predetermined APP may be less than the second predetermined APP. However, the first predetermined APP may be greater than or equal to the second predetermined APP.

A parking marker module 352 sets the parking marker signal 348 to the second state when one or more parking markers are identified around the vehicle (e.g., continuously) for at least a predetermined period. The parking marker module 352 sets the parking marker signal 348 to the first state when parking parkers are not identified around the vehicle for at least the predetermined period. Examples of parking markers include, for example, parking lot lines, curbs, and/or parking stops.

The parking marker module 352 determines whether parking markers are around the vehicle, for example, via the front, right, left, and rear images 312, 316, 320, and 324. For example, the parking marker module 352 determines that one or more parking markers are present when at least one of the front, right, left, and rear images 312, 316, 320, and 324 includes a shape that matches a predetermined shape of a parking marker. Different predetermined shapes are stored in memory for each different type of parking marker. The parking marker module 352 may identify shapes in the front, right, left, and rear images 312, 316, 320, and 324, for example, using a shape or object detection algorithm.

An enabling/disabling module 356 enables and disables the parking module 332. The enabling/disabling module 356 disables the parking module 332 when one or more conditions are satisfied indicative of the vehicle being on a road and not in a parking lot. For example, the enabling/disabling module 356 may disable the parking module 332 when an object identification module 360 identifies a traffic signal (e.g., a stop light, a stop sign, a yield sign, or another type of traffic light or sign) in front of vehicle, when the object identification module 360 identifies a vehicle in front of the vehicle, when a global positioning system (GPS) location 364 indicates that the vehicle is on a road and not a parking lot, and/or when a vehicle to infrastructure (V2I) signal 366 is not received or indicates that a distance (or period) to a next traffic signal is greater than a predetermined distance (or period). When none of the conditions are satisfied, the enabling/disabling module 356 enables the parking module 332.

The object identification module 360 determines whether one or more traffic signals are in front of the vehicle based on the forward facing images 328 captured by the front camera 208. As used herein, traffic signals include stop lights, stop signs, yield sign, and other types of traffic lights and signs. For example, the object identification module 360 determines that one or more traffic signals are in front of the vehicle, indicating that the vehicle is on a road or not likely to be parking, when at least one of the forward facing images 328 includes a shape that matches a predetermined shape of a traffic signal. Different predetermined shapes are stored in memory for each different type of traffic signal. The object identification module 360 may identify shapes in the forward facing images 328, for example, using a shape or object detection algorithm.

The object identification module 360 determines whether one or more vehicles are in front of the vehicle based on the forward facing images 328 captured by the front camera 208. For example, the object identification module 360 determines that one or more vehicles are in front of the vehicle, indicating that the vehicle is on a road or not likely to be parking, when at least one of the forward facing images 328 includes a shape that matches a predetermined shape of a vehicle. Different predetermined shapes are stored in memory for different types of vehicles. The object identification module 360 may identify shapes in the forward facing images 328, for example, using a shape or object detection algorithm.

A road module 368 determines whether the vehicle is on a road and not in an area where parking is available based on the GPS location 364 using a road database 372. The road database 372 may include a listing of locations (e.g., coordinates) of roads, but may be limited to locations of roads where on-road parking is not available. The road module 368 may determine that the vehicle is on a road where parking is not available when the GPS location 364 is included in the road database 372 or within a predetermined distance of a closest location to the GPS location 364 in the road database 372.

The road module 368 may additionally or alternatively determine whether the vehicle is on a road and not in an area where parking is available based on the V2I signal 366. A V2I system generates V2I signals that may be received by the vehicle via an antenna. The road module 368 may determine that the vehicle is on a road where parking is not available when the V2I signal 366 is received and indicates that a distance (or period) to a next traffic signal is less than a predetermined distance (or predetermined period). The road module 368 may determine that the vehicle is not on in an area where parking is available when the V2I signal 366 is not received (e.g., continuously for at least a predetermined period) and/or indicates that the distance (or period) to the next traffic signal is greater than the predetermined distance (or predetermined period).

A surround view module 376 generates an image of the surround view 308 by including a predetermined image of the vehicle and stitching together the front, right, left, and rear images 312, 316, 320, and 324, for example, using a stitching algorithm. The surround view module 376 generates video of the surround view 308, for example, from the images. In various implementations, the surround view module 376 may generate the video of the surround view 308 by stitching together video generated from the front, right, left, and rear images 312, 316, 320, and 324 using a video stitching algorithm.

A human module 380 determines whether a human is within a first predetermined distance around the vehicle based on the front, right, left, rear, and forward images 312, 316, 320, 324, and 328. Examples of humans include pedestrians, bicyclists, and humans using other forms of non-vehicle travel. For example, the human module 380 determines that a human is within the first predetermined distance in front of the vehicle when the front image 312 includes a shape that matches a predetermined shape of a human. As another example, the human module 380 determines that a human is within the first predetermined distance in front of the vehicle when the forward image 328 includes a shape that matches a predetermined shape of a human where at least a portion of the shape is within a predetermined portion of the forward image 328 indicative of the human being within the first predetermined distance in front of the vehicle. For example, the human module 380 determines that a human is within the first predetermined distance behind the vehicle when the rear image 324 includes a shape that matches a predetermined shape of a human. The human module 380 determines that a human is within the first predetermined distance to the right or left of the vehicle when the right or left image 316 or 320, respectively, includes a shape that matches a predetermined shape of a human. Different predetermined shapes are stored in memory for humans. The human module 380 may identify shapes in the front, right, left, and rear images 312, 316, 320, and 324, for example, using a shape or object detection algorithm. The human module 380 may determine a distance between an identified human and the vehicle, for example, based on a size and location of the human within one or more images.

The human module 380 generates a human signal 384 when a human is within the first predetermined distance around the vehicle. The human module 380 also generates the human signal 384 to indicate a location of a human relative to the vehicle and a distance between the vehicle and the human.

The display control module 304 generally displays a split screen video including the surround view 308 video on a first portion of display 184 and video from one of the front, right, left, and rear images 312, 316, 320, and 324 on a second portion (e.g., the remaining portion) of the display 184. For example, when the transmission 110 is in a reverse gear (e.g., as indicated by the PRNDL signal 174), the display control module 304 may display the split screen video on the display including the surround view 308 video displayed on a first portion of the display 184 and video from the rear images 324 on a second portion (e.g., the remaining portion) of the display 184. When the transmission 110 is in a forward or neutral gear (e.g., as indicated by the PRNDL signal 174), the display control module 304 may display the split screen video on the display including the surround view 308 video displayed on a first portion of the display 184 and video from the forward and/or front images 312 and 328 on a second portion (e.g., the remaining portion) of the display 184.

As another example, when an object or a human is identified around the vehicle, the display control module 304 may display the split screen video on the display including the surround view 308 video displayed on a first portion of the display 184 and video in the direction of the object or human on a second portion (e.g., the remaining portion) of the display 184. In the event of multiple objects and/or humans being identified around the vehicle, video in a direction of the closest object or human may be displayed on the second portion of the display 184.

For example, when the human module 380 indicates that a human is within the first predetermined distance in front of the vehicle, the display control module 304 displays the split screen video on the display including the surround view 308 video displayed on the first portion of the display 184 and video from the front images 312 on a second portion (e.g., the remaining portion) of the display 184. When the human module 380 indicates that a human is within the first predetermined distance to the right of the vehicle, the display control module 304 displays the split screen video on the display 184 including the surround view 308 video displayed on a first portion of the display 184 and video from the right side images 316 on a second portion (e.g., the remaining portion) of the display 184. In this example, the second portion may be the right most portion, and the first portion may be the left most portion.

When the human module 380 indicates that a human is within the first predetermined distance to the left of the vehicle, the display control module 304 displays the split screen video on the display 184 including the surround view 308 video displayed on a first portion of the display 184 and video from the left side images 320 on a second portion (e.g., the remaining portion) of the display 184. In this example, the second portion may be the left most portion, and the first portion may be the right most portion. When the human module 380 indicates that a human is within the first predetermined distance behind the vehicle, the display control module 304 displays the split screen video on the display 184 including the surround view 308 video displayed on a first portion of the display 184 and video from the rear images 324 on a second portion (e.g., the remaining portion) of the display 184.

In various implementations, when the human module 380 indicates that a human is within a second predetermined distance of the vehicle, however, the display control module 304 may remove the surround view video from the display 184 and display video in the direction of the human on the entire display 184. The second predetermined distance is less than the first predetermined distance, and both the first and second predetermined distances are greater than zero.

The infotainment module 182 may also generate one or more other indicators when the human module 380 indicates that a human is present. For example, the infotainment module 182 may generate one or more audible alerts via the speakers 190, one or more visual alerts via one or more lights within the passenger cabin, one or more other visual displays on the display 184, and/or one or more tactile alerts (e.g., vibration devices).

Figure 4:
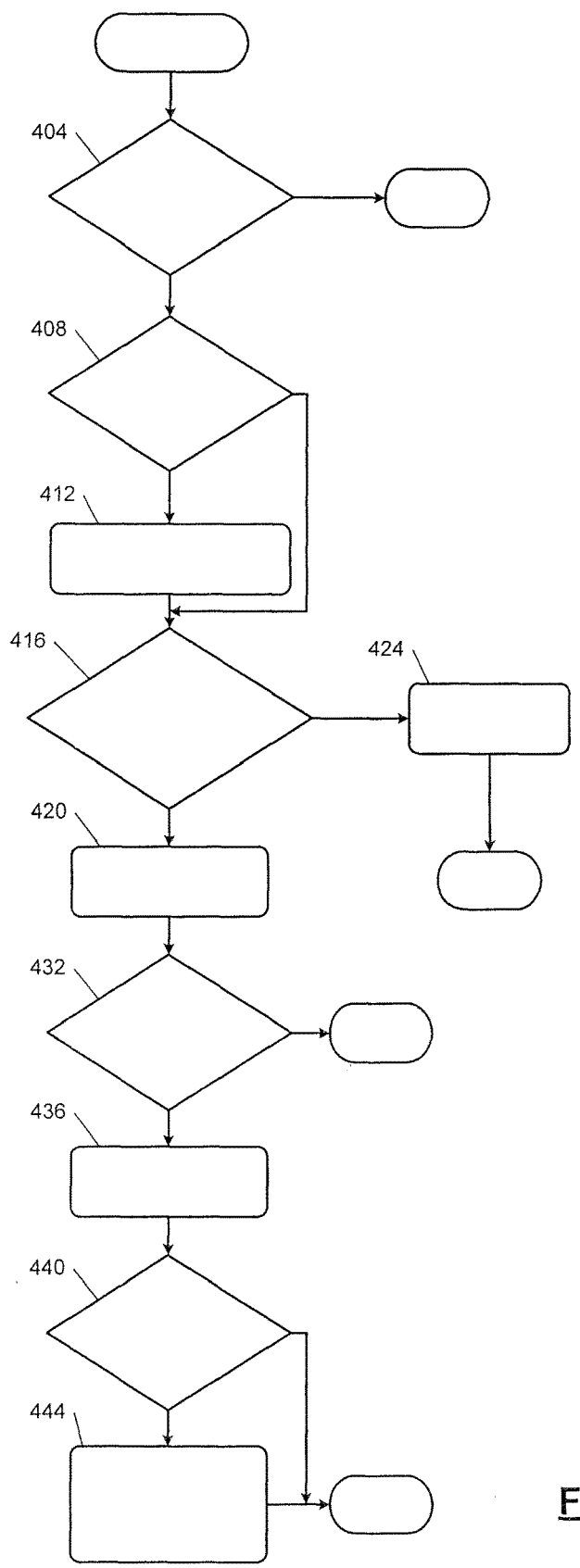
FIG. 4 is a flowchart depicting an example method of displaying video within a vehicle.

FIG. 4 is a flowchart depicting an example method of displaying video on the display 184 within the vehicle. Control may begin with 404 where the enabling/disabling module 356 determines whether the vehicle is on a road where parking is not available. If 404 is true, the enabling/disabling module 356 disables the parking module 332, and control ends. For example, the enabling/disabling module 356 may determine that the vehicle is on a road where parking is not available when the GPS location 364 is included in the road database 372, when the V2I signal 366 is present and indicates that the distance (or period) to the next traffic signal is less than a predetermined distance (or period), when the object identification module 360 detects a traffic signal in front of the vehicle, and/or when the object identification module 360 detects a moving vehicle in front of the vehicle. If 404 is false, the enabling/disabling module enables the parking module 332, and control continues with 408.

At 408, the parking marker module 352 determines whether one or more parking markers have been identified around the vehicle (e.g., continuously) for at least a predetermined period. If 408 is false, control continues with 416. If 408 is true, the parking module 332 may adjust one or more of the predetermined values (which set of predetermined values to use) used to determine whether the vehicle is parking. For example only, the parking module 332 may set the predetermined values to the respective ones of the second set of predetermined values at 412.

Otherwise, the parking module 332 may set the predetermined values to the respective ones of the first set of predetermined values. Control continues with 416.

At 416, the parking module 332 determines whether the vehicle speed 340 is less than the predetermined speed and at least one of: the APP 166 is less than the predetermined APP, the BPP 170 indicates that the brake pedal is depressed/actuated (e.g., set to the second value), and the magnitude of the SWA 142 is greater than the predetermined angle. If 416 is true, the parking module 332 may increment the timer value tracked by the timer module 344 at 420, and control continues with 432, which is discussed further below. If 416 is false, the parking module 332 resets the timer value tracked by the timer module 344 at 424 and control may end.

At 432, the parking module 332 determines whether the timer value tracked by the timer module 344 is greater than a predetermined value. In other words, the parking module 332 determines whether 416 has been true for at least a predetermined period. If 432 is true, control continues with 436. If 432 is false, control may end.

At 436, the display control module 304 displays video of the surround view 308 on the display 184. The surround view module 376 generates the surround view 308 by stitching together the front, right side, left side, and rear images 312, 316, 320, and 324. More particularly, the display control module 304 may display split view video including the surround view 308 video on one portion of the display 184 and video from another view on a second portion of the display 184. For example, the display control module 304 may display video from forward and/or front images 312 and 328 on the other portion of the display when the transmission 110 is in a forward or neutral gear or display video from the rear images 324 when the transmission is in a reverse gear. If an object or a human is identified within the predetermined distance of the vehicle, however, the display control module 304 may display video from the images in the direction of the object or human on the other portion of the display 184.

For example, when the human module 380 indicates that a human is within the first predetermined distance (and greater than the second predetermined distance) to the left of the vehicle, the display control module 304 displays the split screen video on the display 184 including the surround view 308 video displayed on a first portion (e.g., the right portion) of the display 184 and video from the left side images 320 on a second portion (e.g., the remaining left portion) of the display 184. When the human module 380 indicates that a human is within the first predetermined distance behind the vehicle, the display control module 304 displays the split screen video on the display 184 including the surround view 308 video displayed on a first portion of the display 184 and video from the rear images 324 on a second portion (e.g., the remaining portion) of the display 184. When the human module 380 indicates that a human is within the first predetermined distance to the right of the vehicle, the display control module 304 displays the split screen video on the display 184 including the surround view 308 video displayed on a first portion (e.g., the left portion) of the display 184 and video from the right side images 316 on a second portion (e.g., the remaining right portion) of the display 184. When the human module 380 indicates that a human is within the first predetermined distance in front of the vehicle, the display control module 304 displays the split screen video on the display 184 including the surround view 308 video displayed on a first portion of the display 184 and video from the front images 312 on a second portion (e.g., the remaining portion) of the display 184.

At 440, the display control module 304 may determine whether a human (e.g., a pedestrian or bicyclist) has been detected within the second predetermined distance of the vehicle. If 440 is true, the display control module 304 displays video from the images in the direction of the human on the display 184 at 444 and control may end. This provides a larger and more detailed view of the human when the human is closer (within the second predetermined distance of the vehicle). If 440 is false, control may end.

For example, when the human module 380 indicates that a human is within the second predetermined distance to the left of the vehicle, the display control module 304 displays video from the left side images 320 on the display 184 (e.g., on the entire display 184). When the human module 380 indicates that a human is within the second predetermined distance behind the vehicle, the display control module 304 displays video from the rear images 324 on the display 184 (e.g., on the entire display 184). When the human module 380 indicates that a human is within the second predetermined distance to the right of the vehicle, the display control module 304 displays video from the right side images 316 on the display 184 (e.g., the entire display 184). When the human module 380 indicates that a human is within the second predetermined distance in front of the vehicle, the display control module 304 displays video from the front images 312 on the display 184 (e.g., the entire display). While the example of ending is provided, the example of FIG. 4 is illustrative of one control loop and control may return to 404 for a next control loop. Control loops may begin at a predetermined rate.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A display control system of a vehicle, comprising:
a surround view module configured to generate a surround view based on:
(i) first images of an outward front view of in front of the vehicle captured using a first camera;
(ii) second images of an outward right side view to the right of the vehicle captured using a second camera;
(iii) third images of an outward left side view to the left of the vehicle captured using a third camera; and
(iv) fourth images of an outward rear view of behind the vehicle captured using a fourth camera,
wherein the surround view includes a predetermined top view image of the vehicle and one or more features located within a predetermined area around the vehicle captured in the first, second, third, and fourth images;
a parking module configured to selectively generate a parking signal when, for at least a predetermined period, a vehicle speed is less than a predetermined speed and:
(i) an accelerator pedal position is less than a predetermined position;
(ii) a brake pedal position indicates a request for vehicle braking; and
(iii) a magnitude of a steering wheel angle is greater than a predetermined steering wheel angle; and
a display control module configured to, in response to the generation of the parking signal, display the surround view on a display within the vehicle.

2. The display control system of claim 1 further comprising an enabling/disabling module configured to disable the parking module when a global positioning system (GPS) location of the vehicle is at a location where vehicle parking is not available.

3. The display control system of claim 1 further comprising:
an object identification module configured to, based on fifth images in front of the vehicle, identify whether one or more traffic signals are located in front of the vehicle; and
an enabling/disabling module configured to disable the parking module in response to the object identification module identifying that one or more traffic signals are located in front of the vehicle.

4. The display control system of claim 1 further comprising:
an object identification module configured to, based on fifth images in front of the vehicle, identify whether one or more other vehicles are located in front of the vehicle; and
an enabling/disabling module configured to disable the parking module in response to the object identification module identifying that one or more other vehicles are located in front of the vehicle.

5. The display control system of claim 1 further comprising:
an enabling/disabling module configured to disable the parking module when vehicle to infrastructure (V2I) signals are indicative of the vehicle being at a location where vehicle parking is not available.

6. The display control system of claim 1 further comprising a parking marker module configured to, based on at least one of the first, second, third, and fourth images, indicate whether one or more parking markers are located within the predetermined area around the vehicle,
wherein the parking module is configured to, in response to the parking marker module indicating that one or more parking markers are located within the predetermined area around the vehicle, decrease the predetermined steering wheel angle.

7. The display control system of claim 1 further comprising a parking marker module configured to, based on at least one of the first, second, third, and fourth images, indicate whether one or more parking markers are located within the predetermined area around the vehicle,
wherein the parking module is configured to, in response to the parking marker module indicating that one or more parking markers are located within the predetermined area around the vehicle, increase the predetermined position.

8. The display control system of claim 1 further comprising a parking marker module configured to, based on at least one of the first, second, third, and fourth images, indicate whether one or more parking markers are located within the predetermined area around the vehicle,
wherein the parking module is configured to, in response to the parking marker module indicating that one or more parking markers are located within the predetermined area around the vehicle, increase the predetermined position and decrease the predetermined steering wheel angle.

9. The display control system of claim 1 further comprising a human module configured to, based on at least one of the first, second, third, and fourth images, indicate whether one or more humans are located within the predetermined area around the vehicle,
wherein the display control module is configured to, in response to the human module indicating that a human is located within the predetermined area around the vehicle, display, on the display, both:
the surround view on a first portion of the display; and
one of the first, second, third, and fourth images including the human on a second portion of the display, the first and second portions of the display being different portions of the display.

10. The display control system of claim 9 wherein the display control module is configured to, in response to the human module indicating that the human is located less than a predetermined distance from the vehicle:

display only one of the first, second, third, and fourth images including the human on the display, wherein the predetermined distance is less than a distance between the vehicle and a boundary of the predetermined area in the direction of the human.

11. A display control method for a vehicle, comprising:
generating a surround view based on:
- (i) first images of an outward front view of in front of the vehicle captured using a first camera;
- (ii) second images of an outward right side view to the right of the vehicle captured using a second camera;
- (iii) third images of an outward left side view to the left of the vehicle captured using a third camera; and
- (iv) fourth images of an outward rear view of behind the vehicle captured using a fourth camera,
- wherein the surround view includes a predetermined top view image of the vehicle and one or more features located within a predetermined area around the vehicle captured in the first, second, third, and fourth images;

selectively generating a parking signal when, for at least a predetermined period, a vehicle speed is less than a predetermined speed and:
- (i) an accelerator pedal position is less than a predetermined position;
- (ii) a brake pedal position indicates a request for vehicle braking; and
- (iii) a magnitude of a steering wheel angle is greater than a predetermined steering wheel angle; and in response to the generation of the parking signal, displaying the surround view on a display within the vehicle.

12. The display control method of claim 11 further comprising preventing generation of the parking signal when a global positioning system (GPS) location of the vehicle is at a location where vehicle parking is not available.

13. The display control method of claim 11 further comprising:
based on fifth images in front of the vehicle, identifying whether one or more traffic signals are located in front of the vehicle; and
preventing generation of the parking signal in response to the identification of one or more traffic signals are located in front of the vehicle.

14. The display control method of claim 11 further comprising:
based on fifth images in front of the vehicle, identifying whether one or more other vehicles are located in front of the vehicle; and
preventing generation of the parking signal in response to the identification of one or more other vehicles are located in front of the vehicle.

15. The display control method of claim 11 further comprising preventing generation of the parking signal when vehicle to infrastructure (V2I) signals are indicative of the vehicle being at a location where vehicle parking is not available.

16. The display control method of claim 11 further comprising:
based on at least one of the first, second, third, and fourth images, indicating whether one or more parking markers are located within the predetermined area around the vehicle; and
in response to the indication that one or more parking markers are located within the predetermined area around the vehicle, decreasing the predetermined steering wheel angle.

17. The display control method of claim 11 further comprising:
based on at least one of the first, second, third, and fourth images, indicating whether one or more parking markers are located within the predetermined area around the vehicle; and
in response to the indication that one or more parking markers are located within the predetermined area around the vehicle, increasing the predetermined position.

18. The display control method of claim 11 further comprising:
based on at least one of the first, second, third, and fourth images, indicating whether one or more parking markers are located within the predetermined area around the vehicle; and
in response to the indication that one or more parking markers are located within the predetermined area around the vehicle:
increasing the predetermined position; and
decreasing the predetermined steering wheel angle.

19. The display control method of claim 11 further comprising:
based on at least one of the first, second, third, and fourth images, indicating whether one or more humans are located within the predetermined area around the vehicle;
in response to the indication that a human is located within the predetermined area around the vehicle, displaying, on the display, both:
the surround view on a first portion of the display; and
one of the first, second, third, and fourth images including the human on a second portion of the display,
the first and second portions of the display being different portions of the display.

20. The display control method of claim 19 further comprising, in response to the indication that the human is located less than a predetermined distance from the vehicle, displaying only one of the first, second, third, and fourth images including the human on the display,
wherein the predetermined distance is less than a distance between the vehicle and a boundary of the predetermined area in the direction of the human.

* * * * *